US008717406B2

(12) United States Patent
Garcia et al.

(10) Patent No.: US 8,717,406 B2
(45) Date of Patent: *May 6, 2014

(54) MULTI-PARTICIPANT AUDIO/VIDEO COMMUNICATION WITH PARTICIPANT ROLE INDICATOR

(75) Inventors: Luis A. Garcia, Austin, TX (US); Jose Luis Lopez, Austin, TX (US); Jorge A. Rasillo, Round Rock, TX (US); Francisco J. Alanis, Cedar Park, TX (US); Maria Garza, Austin, TX (US); Edgar O. Cantu, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 185 days.

This patent is subject to a terminal disclaimer.

(21) Appl. No.: 13/450,457

(22) Filed: Apr. 18, 2012

(65) Prior Publication Data
US 2012/0206554 A1 Aug. 16, 2012

Related U.S. Application Data

(63) Continuation of application No. 12/770,801, filed on Apr. 30, 2010.

(51) Int. Cl.
*H04N 7/14* (2006.01)
*H04M 3/42* (2006.01)
(52) U.S. Cl.
USPC .................................. 348/14.08; 379/204.01
(58) Field of Classification Search
None
See application file for complete search history.

(56) References Cited

U.S. PATENT DOCUMENTS

| 5,537,181 | A | 7/1996 | Owashi |
| 6,859,144 | B2 | 2/2005 | Newman |
| 7,556,377 | B2 | 7/2009 | Beymer |
| 2005/0168402 | A1 | 8/2005 | Culbertson |
| 2007/0011609 | A1 | 1/2007 | Odjouadi |
| 2009/0273562 | A1* | 11/2009 | Baliga et al. ................... 345/157 |
| 2010/0020951 | A1 | 1/2010 | Basart |
| 2010/0142722 | A1 | 6/2010 | Von Wiegand |
| 2010/0153497 | A1 | 6/2010 | Sylvain |
| 2010/0315482 | A1* | 12/2010 | Rosenfeld et al. ......... 348/14.08 |

OTHER PUBLICATIONS

Ou—"Analyzing and Predicting Focus of Attention in Remote Collaborative Tasks", ICMI'05, Oct. 4-6, 2005, Trento, Italy.
Pannasch—Cogain 2006 Conference on Communication by Gaze Interaction, Turin, Italy (Sep. 4-5, 2006).

(Continued)

*Primary Examiner* — Fan Tsang
*Assistant Examiner* — Jeffrey Lytle
(74) *Attorney, Agent, or Firm* — David Mims; Mark P Kahler

(57) ABSTRACT

An audio/video communication method displays the status of participants in a video chat session. The method employs multiple video chat capable (VCC) information handling systems (IHSs) that display video images of the participants. In this manner, each user may see the user's own video image as well as the video images of other users in the video chat session. When a user speaks, that user's VCC IHS detects audio, thus designating a speaker participant. This user's VCC IHS includes a gaze direction detector that determines at which particular user video image the user gazes, thus determining a target participant. The VCC IHS sends speaker participant ID information and target participant ID information to other VCC IHSs in the video chat session. In response, the other VCC IHSs display an indicator that designates one user video image as the speaker participant and another user video image as the target participant.

16 Claims, 10 Drawing Sheets

(56) References Cited

OTHER PUBLICATIONS

Stiefelhagen—"Modeling Focus of Attention for Meeting Indexing Based on Multiple Cues", IEEE Transactions on Neural Networks, vol. 13, No. 4 (Jul. 2002).

Vertegaal—"The GAZE Groupware System: Mediating Joint Attention in Multiparty Communication and Collaboration", Proceedings of ACH'99 Conference on Human Factors in Computing Systems. Pittsburgh, PA ACM (1999).

* cited by examiner

100

MULTI-PARTICIPANT AUDIO/VIDEO COMMUNICATION WITH PARTICIPANT ROLE INDICATOR

This patent application is a continuation of, and claims priority to, the U.S. patent application entitled "Multi-Participant Audio/Video Communication System with Participant Role Indicator", inventors Garcia, et al., Ser. No. 12/770,801, filed Apr. 30, 2010, that is assigned to the same Assignee as the subject patent application, the disclosure of which is incorporated herein by reference in its entirety.

BACKGROUND

The disclosures herein relate generally to information handling systems (IHSs), and more specifically, to audio/video communication between users of information handling systems.

Audio-based teleconferencing systems are commonplace in today's business world and the consumer market as well. While such "speaker-phone" systems are useful, they do not faithfully replicate the experience of face-to-face meetings. A video chat system, namely a system wherein each user employs an information handling system with both audio and video connection capabilities, may provide a closer approximation of the face-to-face meeting.

BRIEF SUMMARY

In one embodiment, a communication method is disclosed that includes transmitting user audio information and user video images among a plurality of video chat capable (VCC) information handling systems (IHSs) in a video chat session, each VCC IHS being responsive to a respective user, each VCC IHS including a respective gaze direction detector. The method also includes displaying, by each VCC IHS, a video image of the user of that VCC IHS and respective video images of the users of the other VCC IHSs in the video chat session. The method further includes detecting, by a particular VCC IHS, audio from a user of the particular VCC IHS, thus designating a speaker participant. The method still further includes activating, by the particular VCC IHS, the gaze direction detector thereof to determine the particular user video image at which the user of the particular VCC IHS is currently gazing, thus designating a target participant. The method also includes transmitting, by the particular VCC IHS, speaker participant identification (ID) information and target participant identification (ID) information to other VCC IHSs in the video chat session. The method further includes receiving, by the other VCC IHSs, the speaker participant (ID) information and target participant (ID) information. The method still further includes displaying, by one of the other VCC IHSs, an indicator that designates one user video image as a speaker participant based on received speaker ID information and that designates another of the user video images as a target participant based on received target participant ID information.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Figure 1:
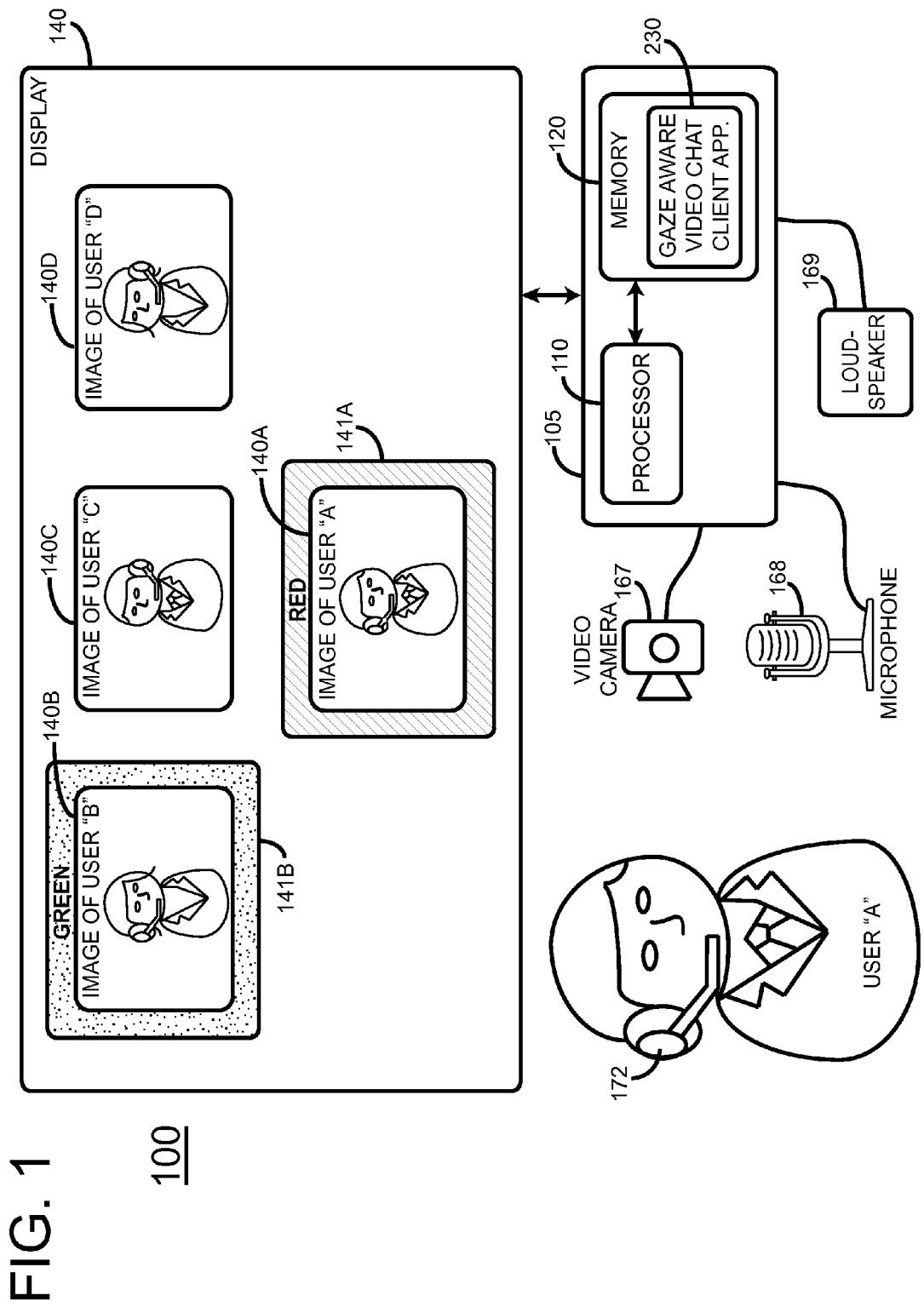
FIG. 1 shows a block diagram of one embodiment of a video chat capable (VCC) information handling system (IHS) that a user "A" may employ in the disclosed video chat communication system.

An audio/video communication system includes a server information handling system (IHS) to which multiple client IHSs may couple. Another name for this audio/video communication is a video chat system. The server IHS acts as a video chat server that manages communications among video chat clients. Each video chat participant, i.e. user, employs a respective video chat client IHS. The video chat server coordinates the display of the participants' images for a particular video chat session on the displays of the respective client IHSs. In this manner, a user of a particular client IHS may see the images of the other participants on the user's display as well as the user's own image. The video chat server also provides for transmission of audio and voice signals among the participants using the client IHSs.

The participants in a video chat session at a particular point in time include a speaking participant who speaks to a target participant. The participants may also include one or more passive participants. At any point in time, the participants may switch roles. The system may continually evaluate the status of the participants as being a speaker participant, a target participant or a passive participant. Each client IHS includes a display that displays multiple live video images depicting the participants in a chat session. For example, a client IHS display may show a live video image of the speaking participant, the target participant and the passive participants in respective frames on the display.

Each client IHS in the disclosed video chat system includes a microphone to detect when a user is speaking. Each client IHS also includes gaze direction detector or eye tracker that monitors the user's eyes to determine at which participant's image on the display the user looks when speaking. The client IHS of the speaking participant sends the resultant eye tracking information to the video chat server when the user of that client IHS takes the role of the speaking participant by speaking and generating audio. The video chat server receives this eye tracking information that designates or identifies a particular target participant. The video chat server thus knows both the speaking participant and the target participant. The video chat server sends information identifying the speaking participant and the target participant to each of the client IHSs. In response, each client IHS displays the live video image of the speaking participant together with a speaking participant indicator. Moreover, each client IHS displays the image of the target participant with a target participant indicator that distinguishes the target participant from the speaking participant. The displays also display the live video images of the passive participants along with the speaking participant and the target participant. In this manner, upon viewing a client display, each participant is apprised of the current roles or status of each of the participants in the video chat session.

FIG. 1 is a block diagram of a representative video chat capable (VCC) client IHS 100 configured to display user "A" as the speaking participant and user "B" as the target participant. Client IHS 100 displays users "C" and "D" as passive participants. Another name for client IHS 100 is client A, namely the client IHS for user "A". IHS 100 includes a system unit 105 with a processor 110 coupled to a memory 120. A video camera 167 couples to system unit 105 to provide a live video image of user "A" for use in a video chat session. User "A" is depicted to the left of video camera 167 in FIG. 1. A microphone 168 couples to system unit 105 to provide audio from user "A" for use in the video chat session. A loudspeaker 169 couples to system unit 105 so that user "A" may hear audio from other participants in the video chat session. Alternatively, instead of employing microphone 168 and loudspeaker 169, a combined headset/microphone 172 may wirelessly couple to system unit 105 to provide audio services.

System unit 105 displays live video images of each of the participants of the video chat session on display 140. More particularly, as seen in FIG. 1, display 140 includes a video image of user "A" in a frame 140A. In this particular embodiment, the display 140 displays the image of the user of the particular IHS 100 in fixed location in the lower center portion of the display. In this manner, the user will come to expect his/her video image to be at the same location for each chat session. Other embodiments are possible with the user's video image located in other regions of the display depending on the particular application.

In this particular example, user "A" is the speaking participant and user "B" is the target participant. User "A" designates user "B" as the target participant by gazing at frame 140B that shows the image of user "B" on display 140. Gaze aware application 230 and video camera 167 together act as a gaze direction detector that can determine at which particular one of the user video images (i.e. which of frames 140A, 140B, 140C and 140D) the user is currently gazing or looking. Display 140 includes the video image of passive user "C" in frame 140C and the video image of passive user "D" in frame 140D. To denote user "A" as the speaking participant, VCC client IHS 100 shows frame 140A inside a red colored rectangle 141A. The red colored rectangle 141A acts as an indicator of the participant's current status or role as the speaker in the video chat session. To denote user "B" as the target participant, client IHS 100 shows frame 140B inside a green colored rectangle 141B. In this manner, user' may readily distinguish the speaking participant and the target participant during a video chat session by observing the red and green rectangles around those users' images, respectively.

Figure 2:
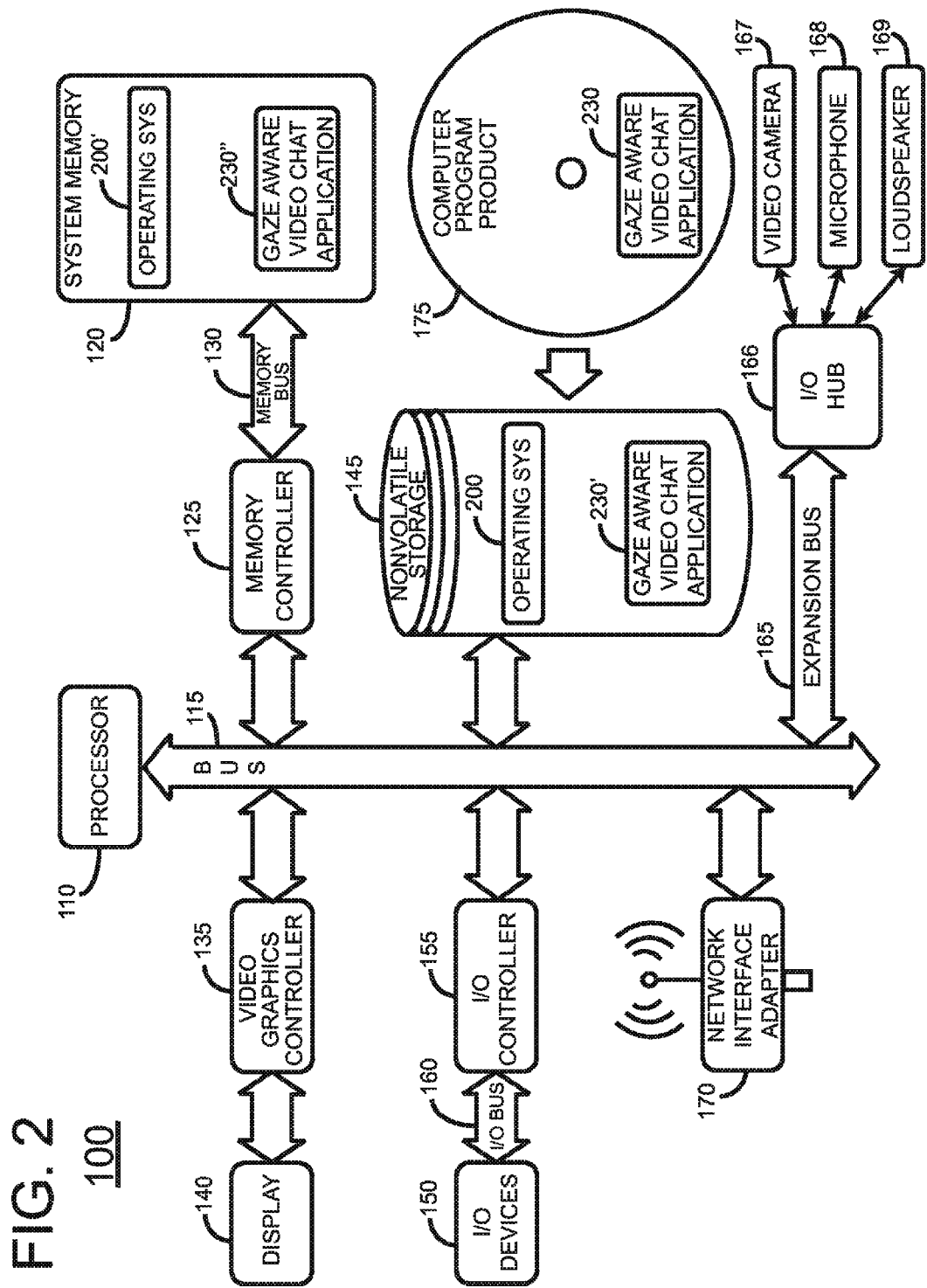
FIG. 2 is a block diagram of a representative IHS that may be used as a video chat client system or a video chat server.

FIG. 2 is a block diagram of an information handling system (IHS) that may be used as client IHS 100 of FIG. 1 and the other client IHS discussed below. IHS 100 includes a processor 110 that may include multiple cores. IHS 100 processes, transfers, communicates, modifies, stores or otherwise handles information in digital form, analog form or other form. IHS 100 includes a bus 115 that couples processor 110 to system memory 120 via a memory controller 125 and memory bus 130. In one embodiment, system memory 120 is external to processor 110. System memory 120 may be a static random access memory (SRAM) array or a dynamic random access memory (DRAM) array. Processor 110 may also include local memory (not shown) such as L1 and L2 caches (not shown). A video graphics controller 135 couples display 140 to bus 115. Nonvolatile storage 145, such as a hard disk drive, CD drive, DVD drive, or other nonvolatile storage couples to bus 115 to provide IHS 100 with permanent storage of information. I/O devices 150, such as a keyboard and a mouse pointing device, couple to bus 115 via I/O controller 155 and I/O bus 160.

One or more expansion busses 165, such as USB, IEEE 1394 bus, ATA, SATA, PCI, PCIE, DVI, HDMI and other busses, couple to bus 115 to facilitate the connection of peripherals and devices to IHS 100. An input/output hub 166, such as a USB hub, couples to expansion bus 165 to couple video camera 167, microphone 168 and loudspeaker 169 to bus 115. A network interface adapter 170 couples to bus 115 to enable IHS 100 to connect by wire or wirelessly to a network and other information handling systems. In this embodiment, network interface adapter 170 may also be called a network communication adapter or a network adapter. While FIG. 1 shows one IHS that employs processor 110, the IHS may take many forms. For example, IHS 100 may take the form of a desktop, server, portable, laptop, notebook, or other form factor computer or data processing system. IHS 100 may take other form factors such as a gaming device, a personal digital assistant (PDA), a portable telephone device, a communication device or other devices that include a processor and memory.

IHS 100 includes a computer program product, namely video chat application 230, on digital media 175 such as a CD, DVD or other media. In one embodiment, a designer, user or other entity installs gaze aware video chat application 230 on nonvolatile storage 145 to practice the disclosed video chat methodology. In practice, IHS 100 may store an operating system 200 (OPERATING SYS) and gaze aware video chat application 230 on nonvolatile storage 145 as operating system 200 and gaze aware video chat application 230'. When IHS 100 initializes, the IHS loads operating system 200' into system memory 120 for execution as operating system 200". IHS 100 also loads gaze aware video chat application 230' into system memory 120 as gaze aware video chat application 230".

As will be appreciated by one skilled in the art, aspects of the disclosed process status determination methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product, such as computer program product 175 embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIG. 7 flowchart illustration and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts of FIGS. 7 and 4 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 7:
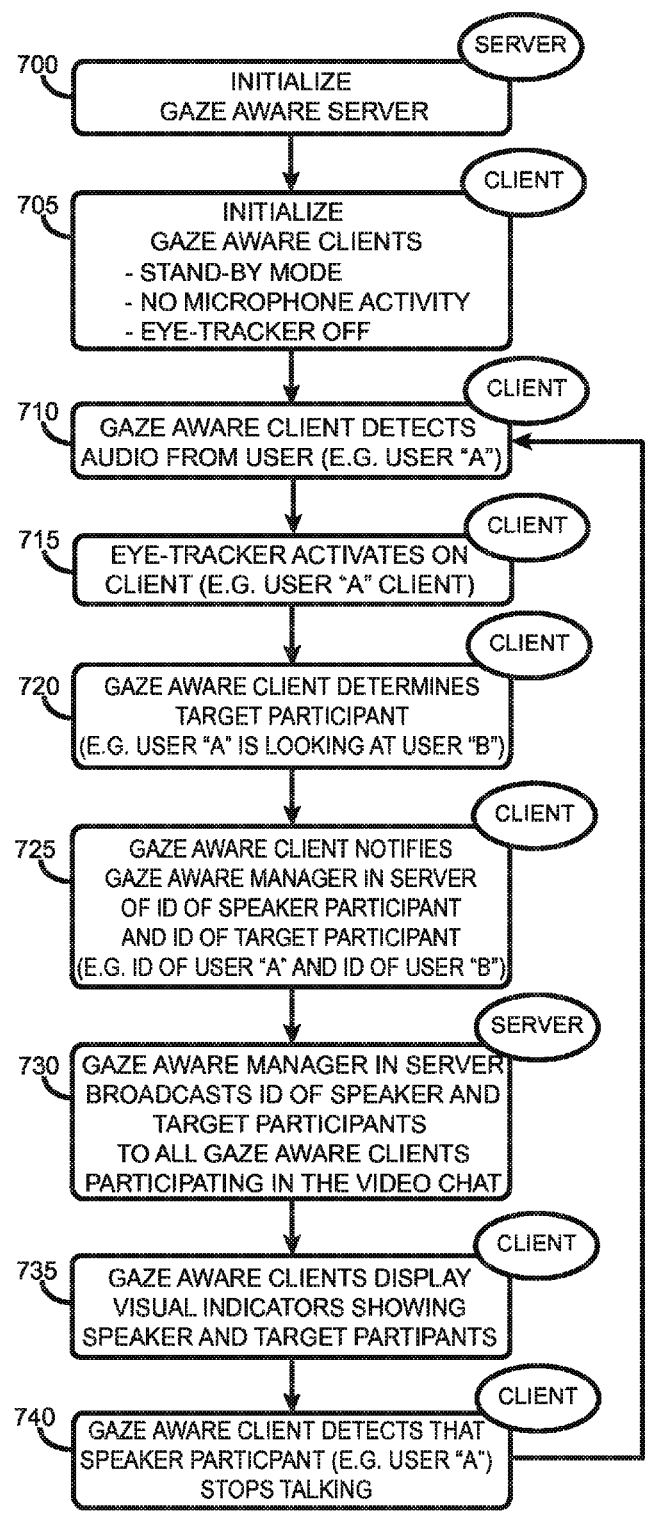
FIG. 7 is a flowchart of the disclosed video chat communication method that is implemented by the video chat server IHS and the multiple VCC client IHSs.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIG. 7 described below.

The flowcharts of FIG. 7 illustrate the architecture, functionality, and operation of possible implementations of systems, methods and computer program products that perform network analysis in accordance with various embodiments of the present invention. In this regard, each block in the flowchart of FIG. 7 may represent a module, segment, or portion of code, which comprises one or more executable instructions for implementing the specified logical function(s). It should also be noted that, in some alternative implementations, the functions noted in the block may occur out of the order noted in FIG. 7. For example, two blocks shown in succession may, in fact, be executed substantially concurrently, or the blocks may sometimes be executed in the reverse order, depending upon the functionality involved. It will also be noted that each block of FIG. 7 and combinations of blocks in the block diagrams and/or flowchart illustration, can be implemented by special purpose hardware-based systems that perform the specified functions or acts, or combinations of special purpose hardware and computer instructions.

Figure 3:
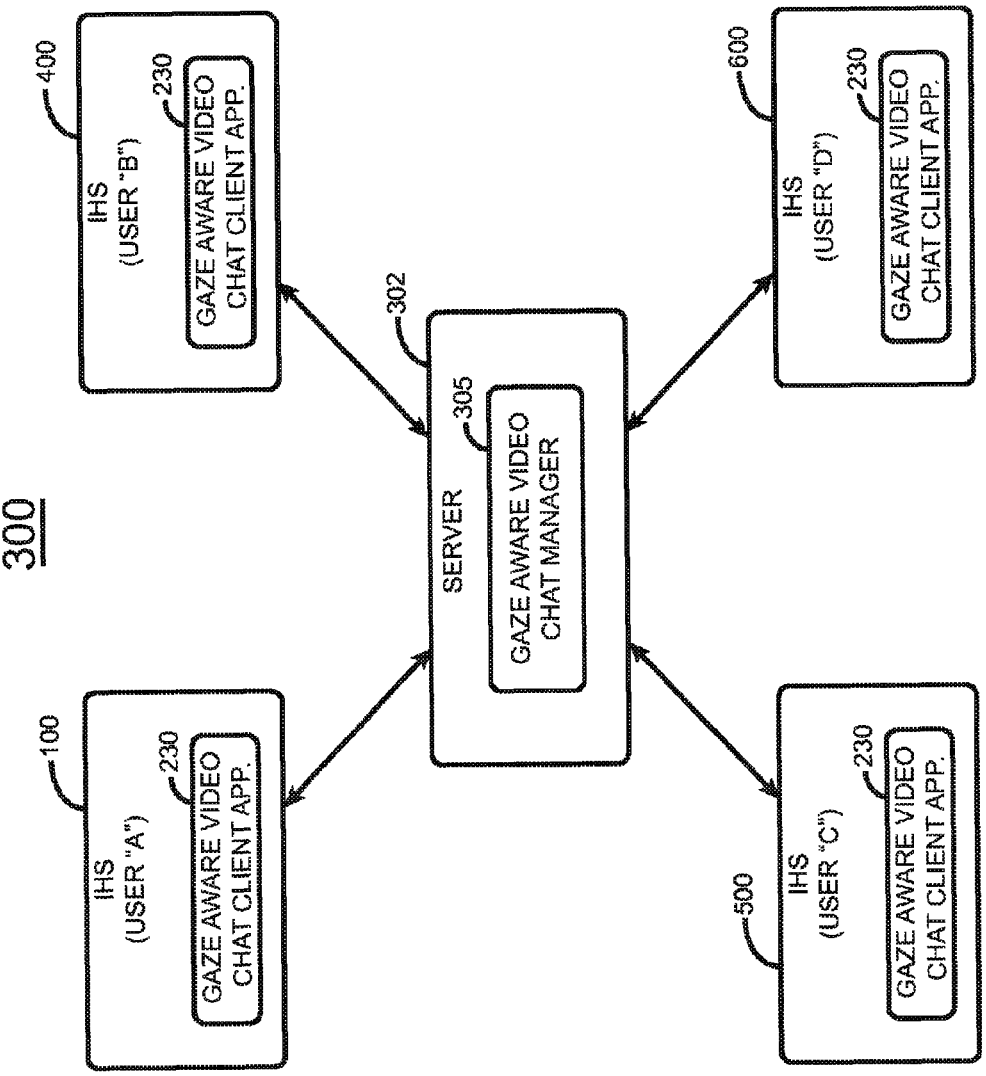
FIG. 3 is a block diagram of the disclosed video chat communication system including both a video chat server IHS and multiple video chat capable (VCC) client IHSs.

FIG. 3 is a block diagram of one embodiment of the disclosed video chat system 300 that includes a gaze aware video chat server 302 coupled to gaze aware video chat client IHSs 100, 400, 500 and 600. These client IHSs may also be referred to as video chat capable (VCC) IHSs. Gaze aware video chat server 302 includes a gaze aware video chat manager application 305 that manages video chat communications between video chat client IHSs 100, 400, 500 and 600. Video chat client IHSs 100, 400, 500 and 600 includes gaze aware video chat client applications 230. Gaze aware video chat client applications 230 in client IHSs 100, 400, 500 and 600 send video chat communications to a gaze aware video chat manager 305 that manages those communications. For example, when user "A" of client IHS 100 speaks, gaze aware video chat client application 230 of client IHS 100 detects audio activity from user "A". User "A" is thus currently the speaking participant. In response to user "A's" audio activity, gaze aware video chat application 230 uses video camera 167 to scan the eyes of user "A" in one embodiment. In this manner, gaze aware video chat application 230 determines at which user's frame (i.e. for user "B", "C" or "D") user "A" is looking, thus designating the target participant. When video chat client application 230 makes this determination, it sends information to the video chat server 302 identifying the speaking participant and the target participant. This information is speaker participant identification (ID) information and target participant identification (ID) information.

In response to receiving the speaker participant information and target participant ID information from video chat application 230 in client IHS 100 for user "A", video chat manager 305 broadcasts this information to other client IHSs participating in the video chat session. In other words, video chat manager 305 sends information to client IHS 400 (User "B"), client IHS 500 (user "C") and client IHS 600 (user "D") informing those client IHSs that user "A" is the speaking participant and user "B" is the target participant. In response, the video chat client applications in client IHSs 400, 500 and 600 visually notify their respective users that user "A" is the current speaking participant and that user "B" is the current target participant.

Figure 4:
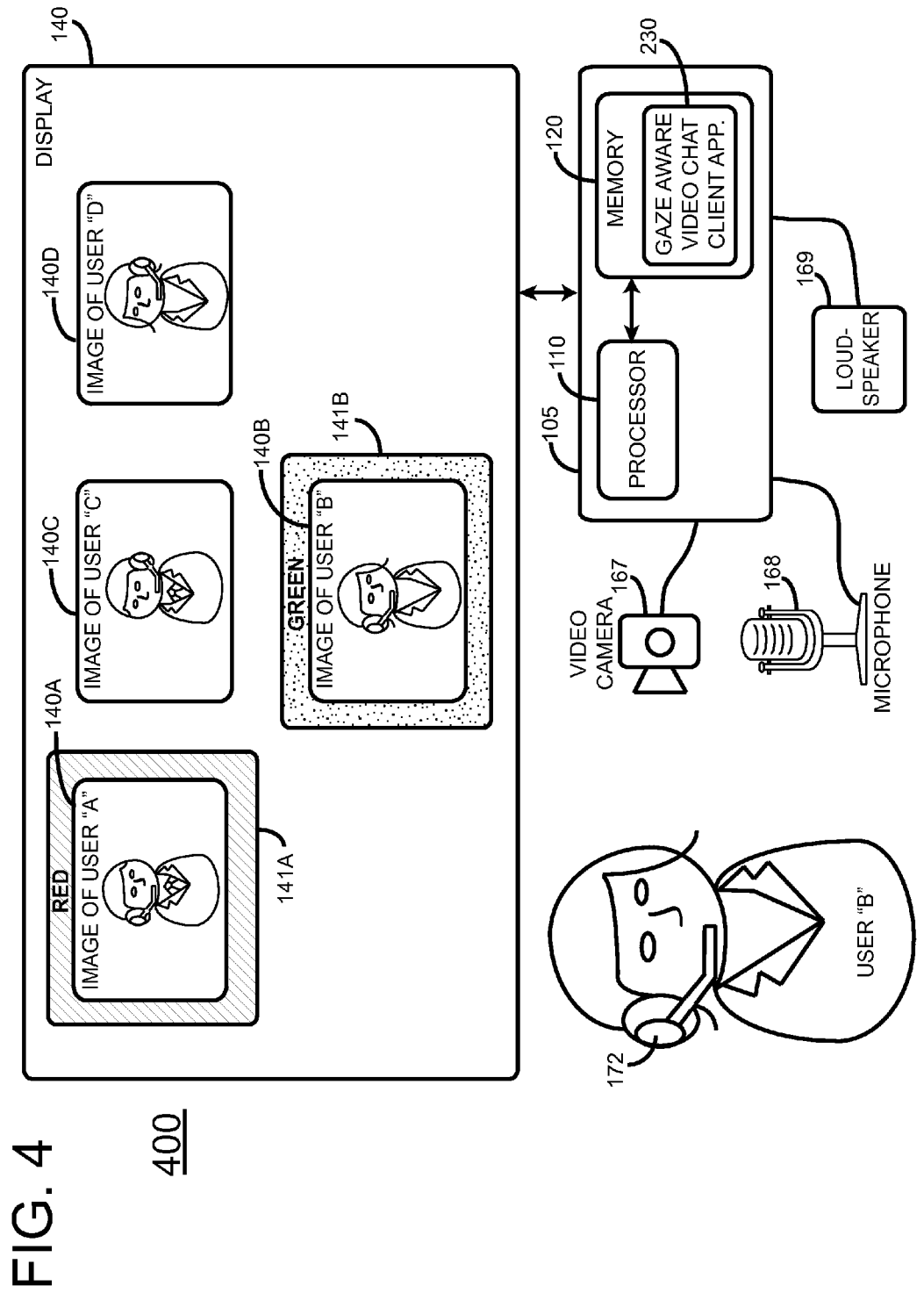
FIG. 4 is a block diagram of one embodiment of a VCC IHS that a user "B" may employ in the disclosed video chat communication system.

For example, in response to receiving information that user "A" is the speaking participant and that user "B" is the target participant, video chat client 230 in the user "B"' client IHS 400 displays information indicating that user "A" is the speaking participant, that user "B" is the target participant and that users "C" and "D" are currently passive participants. FIG. 4 shows one way that client IHS 400 may depict this information to user "B". In this particular example, video chat client application 230 in client IHS 400, generates a red colored rectangle 141A around frame 140A that depicts the image of user "A". The red colored rectangle 141A acts as an indicator that user "A" is the current speaker participant in the video chat session. To denote user "B" as the target participant, client IHS 400 shows frame 140B inside a green colored rectangle 141B. In this manner, user "B" may readily distinguish the speaking participant as being user "A" and the target participant as being user "B" by observing the red and green rectangles around the respective images for those users. Colors other than red and green may also be used as status indicators. In one embodiment, this color choice may be a user selectable option.

Figure 5:
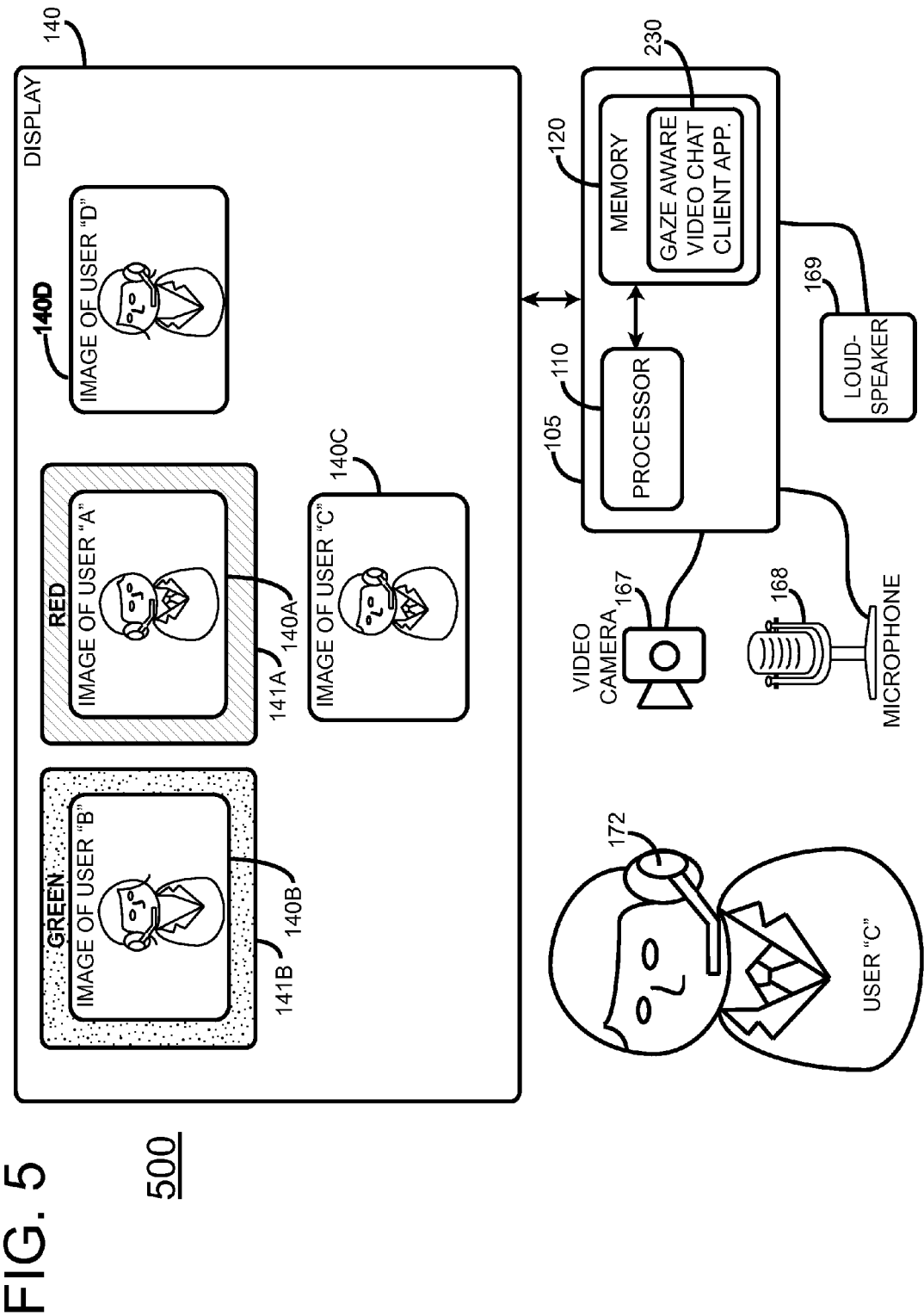
FIG. 5 is a block diagram of one embodiment of a VCC IHS that a user "C" may employ in the disclosed video chat communication system.

As noted above, video chat manager 305 in server IHS 302 also sends participant ID status information to passive participants' IHS 500 for user "C" and IHS 600 for user "D" to inform these users that user "A" is the current speaking participant and user "B" is the current target participant. In response, as seen in FIG. 5, client application 230 of IHS 500 generates display images on display 140 including red colored rectangle 141A around frame 140A that depicts the image of user "A". The red colored rectangle 141A acts as an indicator that user "A" is the current speaking participant in the video chat session. To denote user "B" as the target participant, client IHS 500 shows frame 140B inside a green colored rectangle 141B. In this manner, when user "C" observes his/her display 140, user "C" may readily distinguish the speaking participant as being user "A" and the target participant as being user "B" by observing the red and green rectangles around the respective images for those users. To indicate that users "C" and "D" are currently passive participants in the video chat session, IHS 500 does not generate colored rectangles around the frame 140C of user "C" or the frame 140D around of user "D". In this particular embodiment, the image of the user of the particular IHS, for example user "C" here, appears in a fixed position, for example at the center of the bottom row of images, to indicate that image as being the user's own image. In other words, while the images associated with other users may appear in various locations on display 140, i.e. different row and column positions, the location of the image of the user of the user's own machine appears in a fixed location. In another embodiments, the location of the user's own image is user selectable, but fixed once selected, at least for the duration of a particular chat session.

Figure 6:
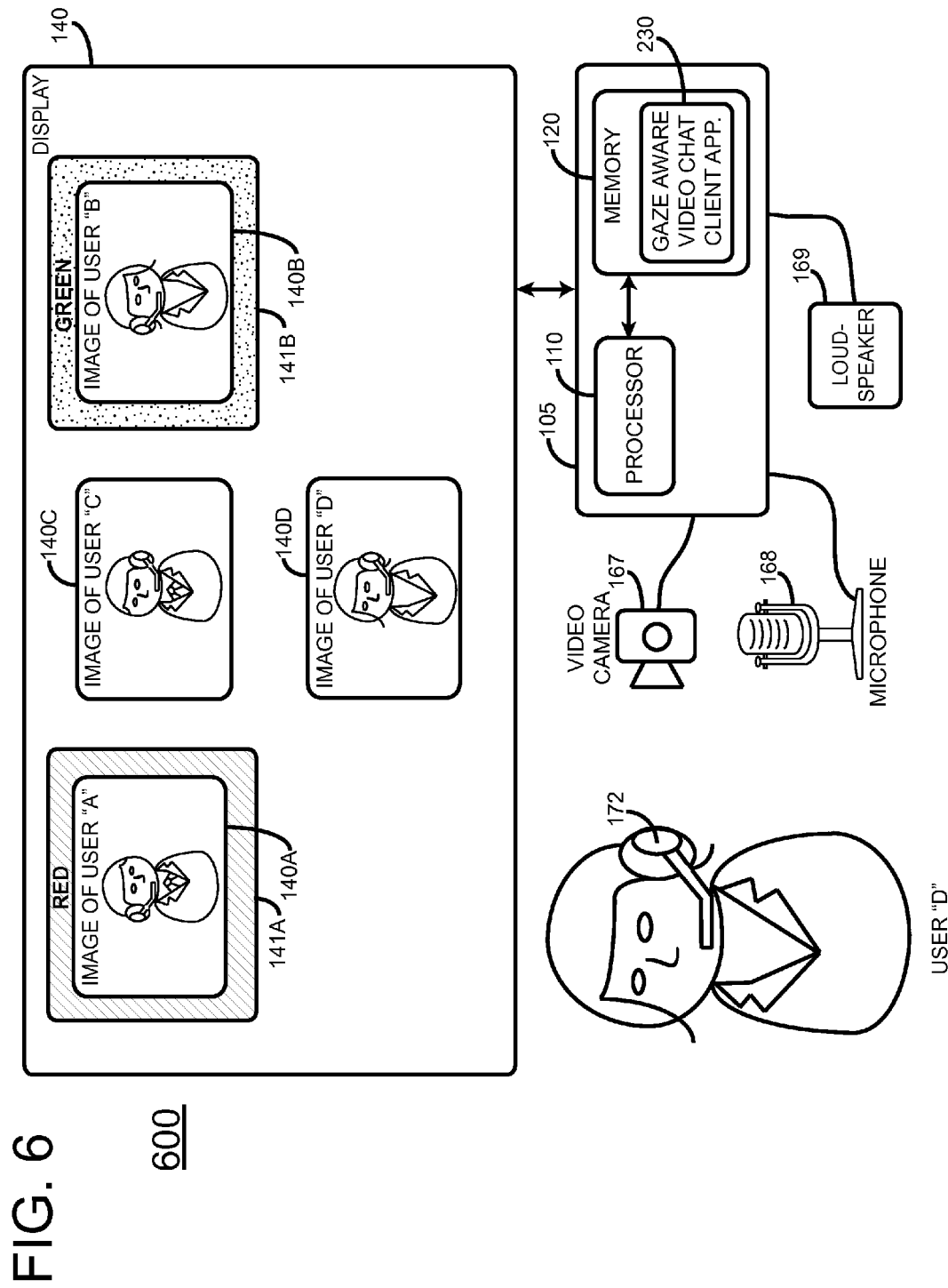
FIG. 6 is a block diagram of one embodiment of a VCC IHS that a user "D" may employ in the disclosed video chat communication system.

As seen in FIG. 6, client IHS 600 of user "D" behaves in a manner similar to client IHS 500 of user "C" when receiving information regarding the current speaking participant and target participant from video chat server 302. In response to this information, client application 230 in IHS 600 generates display images on display 140 including red colored rectangle 141A around frame 140A that depicts the image of user "A". The red colored rectangle 141A acts as an indicator that user "A" is the current speaking participant in the video chat session. To denote user "B" as the target participant, client IHS 600 shows frame 140B inside a green colored rectangle 141B. In this manner, when user "D" observes his/her display 140, user "D" may readily distinguish the speaking participant as being user "A" and the target participant as being user "B" by observing the red and green rectangles around the respective images for those users. To indicate that users "C" and "D" are currently passive participants in the video chat session, IHS 600 does not generate colored rectangles around the frame 140C of user "C" or the frame 140D around of user "D". In an alternative embodiment, to indicate that user's "C" and "D" are current passive participants, IHS 600 may generate colored rectangles around frames 140C and 140D exhibiting a different color than the colored rectangles associated with speaking participant "A" and target participant "B".

FIG. 7 is a flowchart that depicts one embodiment of the disclosed video chat methodology that video chat server 302 and video chat client IHSs 100, 400, 500 and 600 implement. Gaze aware server 302 initializes, as per block 700. This initialization launches the gaze aware video chat manager application 305 that controls video chat activities between video chat client IHSs 100, 400, 500 and 600.

Each of video chat client IHSs 100, 400, 500 and 600 initializes the respective gaze aware chat applications 230 in those IHSs, as per block 705. This launches each video chat client IHS in a standby mode without detected microphone activity and with the eye tracker off. Each video chat client IHS monitors for user audio activity via microphone 168, as per block 710. For discussion purposes, assume that user "A" speaks. Microphone 168 in video chat client IHS 100 senses this audio activity as per block 710 and in response video chat client IHS 100 designates user "A" as a speaking participant. In response to this detection of audio activity, client IHS 100 activates the eye tracking capability of video chat application 230, as per block 715. In more detail, client IHS 100 activates the video camera 167 that monitors the eyes of user "A". Alternatively, video camera 167 and eye tracking may be left on continuously. Gaze aware video chat application 230 monitors the video stream from video camera 167 to determine at which particular user frame user "A" currently gazes on display 140. For example, gaze aware video chat application 230 determines that use "A" currently looks or gazes at the user "B" frame, namely frame 140B. In response to this determination, gaze aware video chat application 230 designates user "B" as the target participant, as per block 720. Gaze aware video chat client application 230 notifies the gaze aware video chat manager 305 in server 302 of the identity of user "A" as the speaking participant and the identify of user "B" as the target participant, as per block 725. Video chat application 230 sends speaker participant identification (ID) information and target participant identification (ID) information to video chat manager 305 in server 302 for this purpose.

Video chat manager 305 in server 302 broadcasts current speaker participant ID information and current target participant ID information to all gaze aware video chat client IHSs 100, 400, 500 and 600 that are in the current video chat session, as per block 730. In response, each video chat client IHS displays a visual indicator to signify that user "A" is the current speaker participant and that user "B" is the current target participant, as per block 735. These roles may change at any time, such as when the speaker participant stops talking, as per block 740. Then the process begins anew to determine the new current speaker participant and the new target participant when process flow continues back to block 710 at which the gaze aware client again monitors for detected audio from a user.

In one embodiment, video chat server 302 may store priority information for each user in a particular chat session to help resolve a contention situation wherein more than one user speaks at the same time. For example, the priority information may be in form of a look-up-table (LUT) as shown in TABLE 1 below.

TABLE 1

| USER ID INFO | PRIORITY |
| --- | --- |
| A (MODERATOR) | 1 |
| B | 4 |
| C | 3 |
| D (MAIN PRESENTER) | 2 |

TABLE 1 shows users A, B, C and D wherein user "A" is the moderator who receives a top priority of "1" with respect to designation of the target participant by gaze direction. User "D" is the main presenter who receives a lower priority of "2". Participants B and C have priorities of 4 and 3, respectively. Thus, if both moderator user "A" and main presenter user "B" are speaking at the same time and indicate respective target participants at the same time, then user "A" wins and video chat manager application 305 broadcasts the ID of user "A" as the current speaker participant and the ID of the particular user that the gaze of user "A" designates. In this manner, server video chat manager application 305 arbitrates and sends selected speaker participant ID information and target participant ID information to the client IHSs according to the priority basis that TABLE 1 specifies.

In response to the speaker participant ID information and the target participant ID information, the displays of client IHSs 100, 400, 500 and 600 all show user "A" as the speaking participant and user "B" as the target participant. In a similar manner, if both "main presenter" user "D" (priority 2) and user "B" (priority 4) are speaking at the same time and indicate respective target participants at the same time by their respective gazes, then user "D" wins and video chat manager application 305 broadcasts the ID of user "D" as the current speaker participant and the ID of the particular user that the gaze of user "D" designates (e.g. user "C"). In response, the displays of client IHSs 100, 400, 500 and 600 all show user "D" as the speaking participant and user "C" as the target participant. Configuring video chat system 302 with a full duplex capability allows all users to see and hear one another at the same time even in contention situations wherein multiple users speak at the same time. The moderator or other individual may provide video chat manager application 205 with the priorities in TABLE 1 before commencement of the video chat session.

Figure 8:
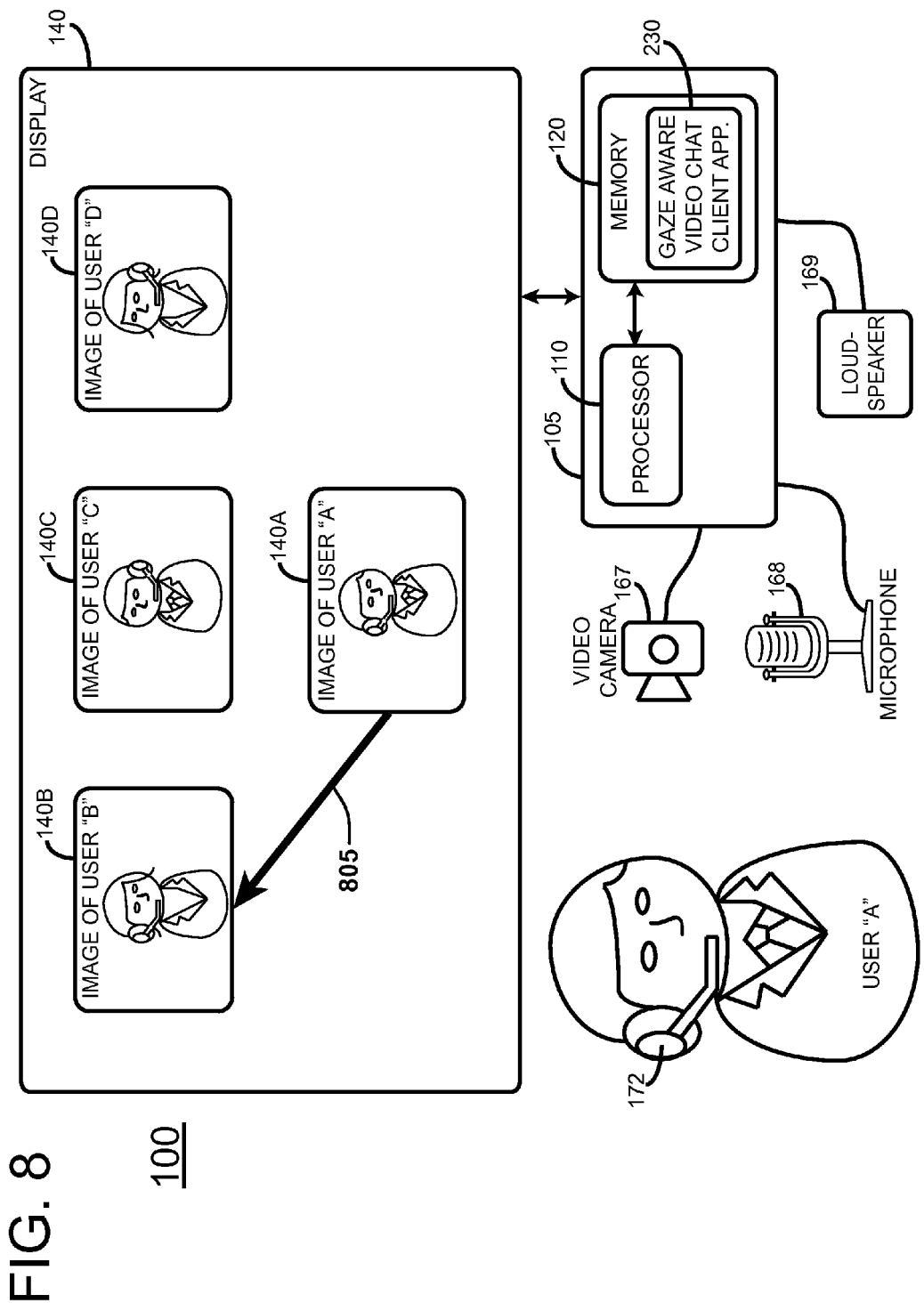
FIG. 8 is a block diagram of one embodiment of a video chat capable (VCC) IHS that shows one indicator that informs users of the current speaking participant and the current target participant.
Figure 9:
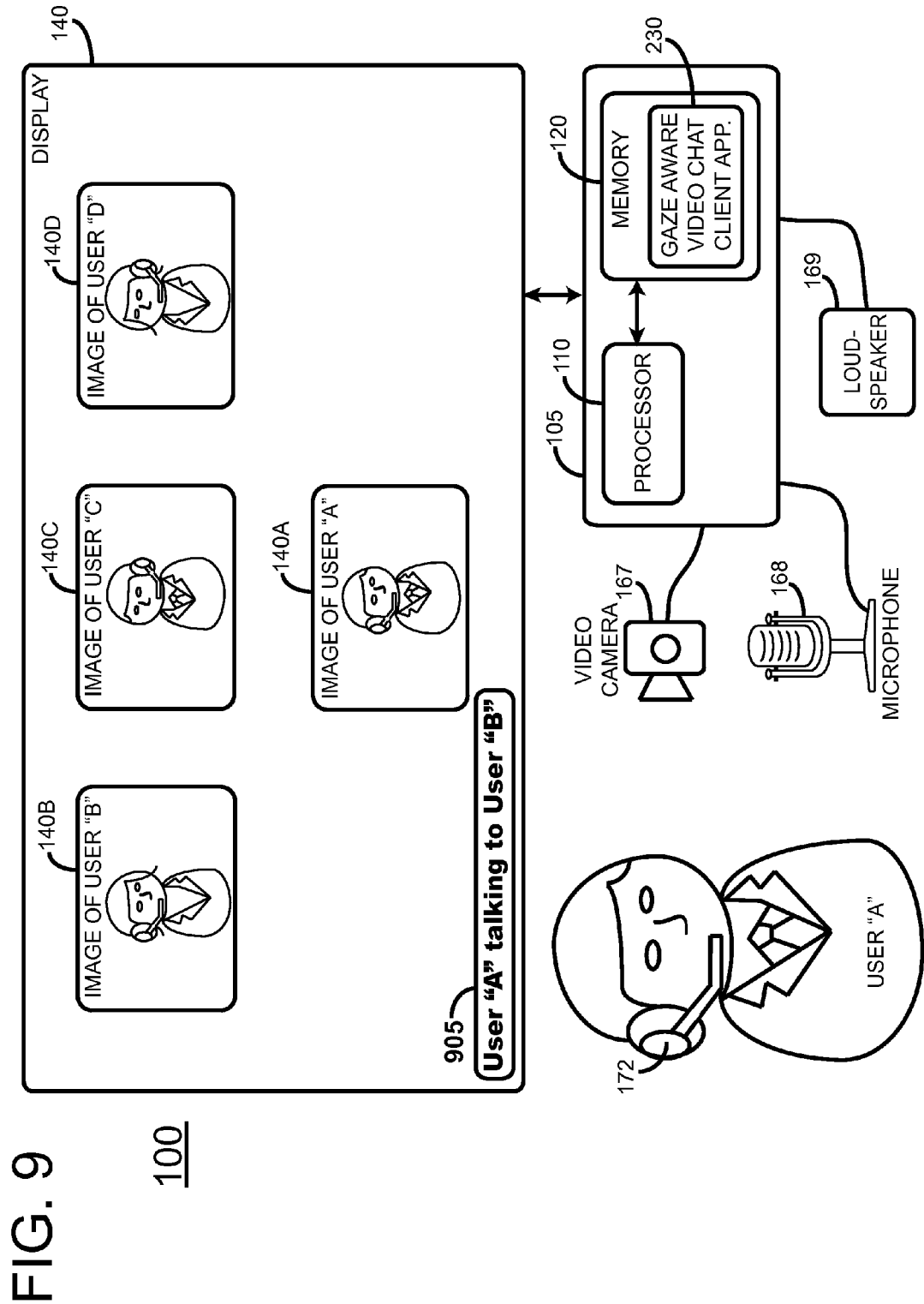
FIG. 9 is a block diagram of one embodiment of a VCC IHS that shows another indicator that informs users of the current speaking participant and the current target participant.
Figure 10:
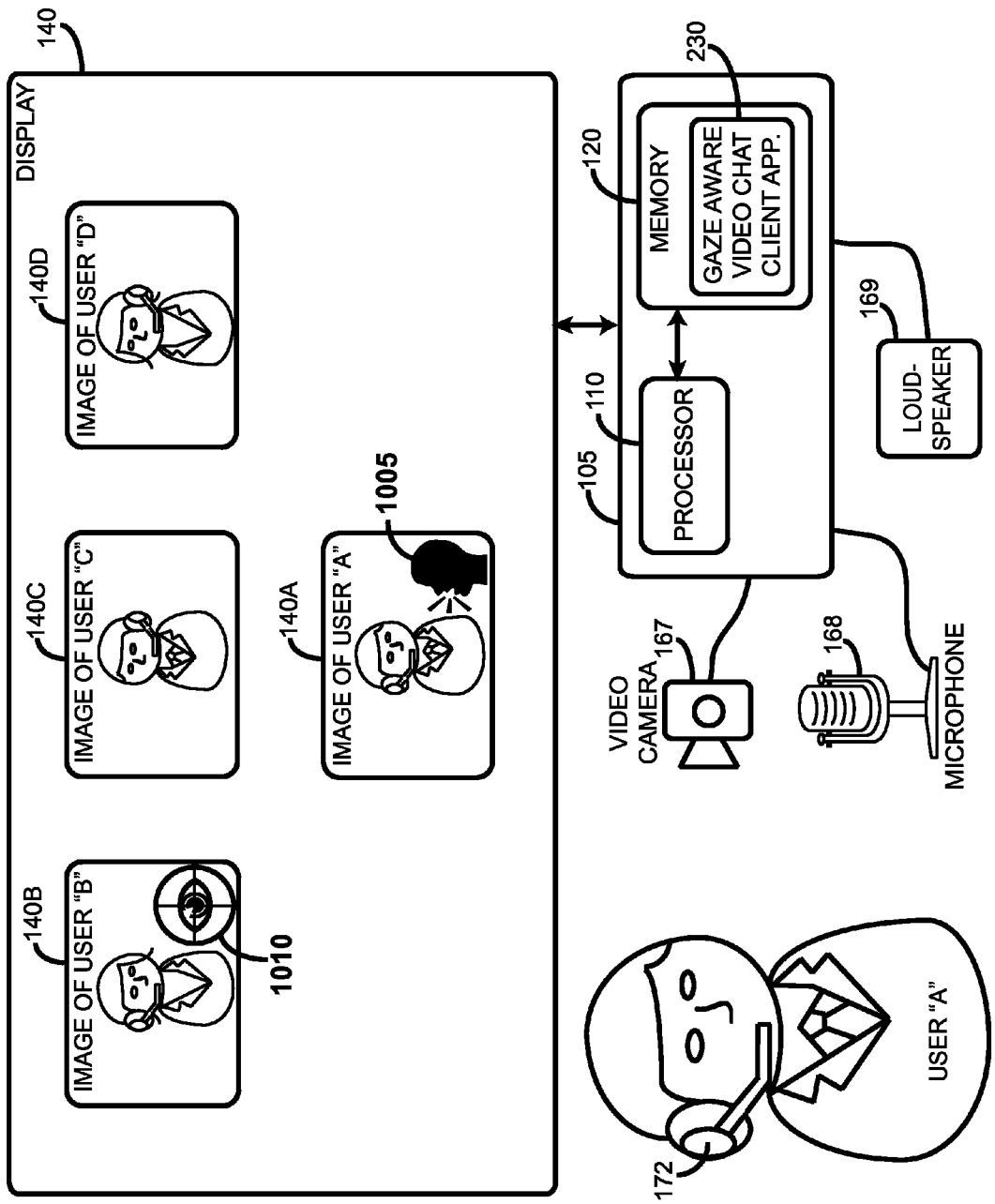
FIG. 10 is a block diagram of one embodiment of a VCC IHS that shows yet another indicator that informs users of the current speaking participant and the current target participant.

In the embodiment above, a different colored rectangle around the respective frames of the current speaker participant and the current target participant is the form of the notification that a gaze aware video chat application displays its uses. However, this notification may take many different forms in other embodiments of the disclosed methodology. For example, as shown in FIG. 8, display 140 may show an arrow 805 from frame 140A to frame 140B to indicate that user "A" is the speaking participant and user "B", to which the arrow points, is the target participant. In another embodiment shown in FIG. 9, display 140 may display a text message 905 stating "User A talking to User B" as the notification. In yet another embodiment shown in FIG. 10, display 140 may display a speaking participant icon 1005, for example a "talking head", within or near frame 140A to designate user "A" as the speaking participant. Display 140 may also display a target icon 1010, for example an eye within target crosshairs, to designate user "B" as the target participant.

As will be appreciated by one skilled in the art, aspects of the disclosed memory management technology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A communication method, comprising:

transmitting user audio information and user video images among a plurality of video chat capable (VCC) information handling systems (IHSs) in a video chat session, each VCC IHS being responsive to a respective user, each VCC IHS including a respective gaze direction detector;

displaying, by each VCC IHS, respective video images of the users of the other VCC IHSs in the video chat session, each VCC IHS also displaying a user video image of the user of that VCC IHS;

detecting, by a particular VCC IHS, audio from a user of the particular VCC IHS, thus designating a speaker participant;

activating, by the particular VCC IHS, the gaze direction detector thereof to determine the particular user video image at which the speaker participant is currently gazing, thus designating a target participant, other users being designated as passive participants;

transmitting, by the particular VCC IHS, speaker participant identification (ID) information and target participant identification (ID) information to other VCC IHSs in the video chat session;

displaying, by a display of the particular VCC IHS, the user video image of the target participant at which the speaker participant is gazing as determined by the gaze direction detector, the particular display also displaying the user video image of the speaker participant and user video images of passive participants, wherein the display of the particular VCC IHS displays a speaking participant indicator to visually indicate the speaking participant and a target participant indicator to visually indicate the target participant as determined by the gaze of the speaking participant;

receiving, by the other VCC IHSs, the speaker participant (ID) information and target participant (ID) information; and displaying, by a display of one of the other VCC IHSs, the speaking participant indicator in response to receiving the speaker participant (ID) information to indicate the speaking participant to a user of the one of the other VCC IHSs, and that displays the target participant indicator in response to the receiving the target ID information to indicate the target participant to the user of the another IHS as determined by the gaze of the speaking participant, the another display further displaying other user video images as passive participants.

2. The method of claim 1, wherein the transmitting speaker participant ID information and target participant ID information step comprises transmitting, by the particular VCC IHS, speaker participant identification (ID) information and target participant identification (ID) information to a server IHS that includes a gaze aware video chat manager.

3. The method of claim 2, wherein the gaze aware video chat manager of the server transmits the speaker participant identification (ID) information and target participant identification (ID) information to the plurality of VCC IHSs in the video chat session.

4. The method of claim 1, wherein the activating step is in response to detection of audio by the detecting step.

5. The method of claim 1, wherein the displaying by each VCC IHS respective video images of the users step comprises displaying a first color indicator that designates one user video image as a speaker participant and a second color indicator that designates another user video image as a target participant.

6. The method of claim 1, wherein the displaying by each VCC IHS respective video images of the users step comprises displaying an arrow from a speaker participant video image to a target participant video image to distinguish the speaker participant video image from the target participant video image.

7. The method of claim 1, wherein the displaying by each VCC IHS respective video images of the users step comprises displaying a text message to distinguish the speaker participant video image from the target participant video image.

8. The method of claim 1, wherein the displaying by each VCC IHS respective video images of the users step comprises displaying first and second icons associated with the speaker participant video image and the target participant video image, respectively, to distinguish the speaker participant video image from the target participant video image.

9. A communication method for a video chat capable (VCC) information handling system (IHS), comprising:
receiving, by a particular VCC IHS, a plurality of user video images from other VCC IHSs in a video chat session, thus providing received user video images;
displaying, by the particular VCC IHS, the received user video images on a display of the particular VCC IHS, the particular VCC IHS also displaying a user video image of the user of the particular IHS;
detecting, by the particular VCC IHS, audio from the user of the particular VCC IHS, thus designating a speaker participant;
determining, by a gaze direction detector in the particular VCC IHS, the particular user video image at which the speaker participant is currently gazing on the display, thus designating a target participant, other users being designated as passive participants; and
transmitting, by the particular VCC IHS, speaker participant identification (ID) information and target participant identification (ID) information for use by other VCC IHSs in the video chat session;
displaying, by a display of the particular VCC IHS, the user video image of the target participant at which the speaker participant is gazing as determined by the gaze direction detector, the particular display also displaying the user video image of the speaker participant and user video images of passive participants, wherein the display of the particular VCC IHS displays a speaking participant indicator to visually indicate the speaking participant and a target participant indicator to visually indicate the target participant as determined by the gaze of the speaking participant;
receiving, by another VCC IHS, the speaker participant (ID) information and target participant (ID) information;
displaying, by a display of the another VCC IHS, the speaking participant indicator in response to receiving the speaker participant (ID) information to indicate the speaking participant to a user of the another VCC IHS, and that displays the target participant indicator in response to the receiving the target ID
information to indicate the target participant to the user of the another IHS as determined by the gaze of the speaking participant, the another display further displaying other user video images as passive participants.

10. The method of claim 9, wherein the transmitting speaker participant ID information and target participant ID information step comprises transmitting, by the particular VCC IHS, speaker participant identification (ID) information and target participant identification (ID) information to a server IHS that includes a gaze aware video chat manager.

11. The method of claim 10, wherein the gaze aware video chat manager of the server transmits the speaker participant identification (ID) information and target participant identification (ID) information to a plurality of VCC IHSs in the video chat session.

12. The method of claim 9, wherein the determining by the gaze detector step is in response to detection of audio by the detecting step.

13. The method of claim 9, wherein the displaying by the particular VCC IHS the received user video images step comprises displaying a first color indicator that designates one user video image as a speaker participant and a second color indicator that designates another user video image as a target participant.

14. The method of claim 9, wherein the displaying by the particular VCC IHS the received user video images step comprises displaying an arrow from a speaker participant video image to a target participant video image to distinguish the speaker participant video image from the target participant video image.

15. The method of claim 9, wherein the displaying by the particular VCC IHS the received user video images step comprises displaying a text message to distinguish the speaker participant video image from the target participant video image.

16. The method of claim 9, wherein the displaying by the particular VCC IHS the received user video images step comprises displaying first and second icons associated with the speaker participant video image and the target participant video image, respectively, to distinguish the speaker participant video image from the target participant video image.

* * * * *